United States Patent [19]
Deal

[11] Patent Number: 5,439,138
[45] Date of Patent: Aug. 8, 1995

[54] DOSAGING DEVICE AND METHOD OF DOSAGING

[75] Inventor: Michel Deal, St-Remy-en-Rollat, France

[73] Assignee: Sedepro, Paris, France

[21] Appl. No.: 172,586

[22] Filed: Dec. 23, 1993

[30] Foreign Application Priority Data

Dec. 31, 1992 [FR] France ............... 92 16052

[51] Int. Cl.⁶ .......................................... B67D 5/52
[52] U.S. Cl. ......................................... 222/1; 222/254; 222/309
[58] Field of Search .................. 222/1, 254, 252, 263, 222/309, 380, 389

[56] References Cited

U.S. PATENT DOCUMENTS

| | | | |
|---|---|---|---|
| 2,408,285 | 9/1946 | Ashbaugh | 222/254 X |
| 2,649,289 | 8/1953 | Giberson | 222/254 X |
| 3,233,790 | 2/1966 | Mogi et al. | 222/254 |
| 3,563,168 | 2/1971 | Doninger | 100/215 |
| 3,580,302 | 5/1971 | Riesenberg | 222/309 X |
| 3,666,147 | 5/1972 | Shiraki et al. | 222/309 |
| 3,750,911 | 8/1973 | Ebner et al. | 222/254 |
| 3,892,338 | 7/1975 | Trueman et al. | 222/254 |
| 5,172,835 | 12/1992 | Hudcovic et al. | 222/380 |

FOREIGN PATENT DOCUMENTS

| | | | |
|---|---|---|---|
| 0465981 | 1/1992 | European Pat. Off. | |
| 18001 | 8/1956 | Germany | 222/254 |

*Primary Examiner*—Kevin P. Shaver
*Attorney, Agent, or Firm*—Brumbaugh, Graves, Donohue & Raymond

[57] ABSTRACT

The dosaging device comprises a dosaging slide 1 actuated by a pivoting rocker 14 via a connecting rod 17. It slides within a groove 2. A unit volume is defined facing the dosaging slide 1 when the latter is at its bottom dead center. The dosaging slide 1 advances towards its top dead center to deliver the dosaged material into a transfer chamber 4.

11 Claims, 10 Drawing Sheets

DOSAGING DEVICE AND METHOD OF DOSAGING

BACKGROUND OF THE INVENTION

The present invention relates to the quantitative dosaging of various materials, more particularly granulated or powdered products.

The dosaging of products by weight or volume comprises numerous industrial application. In certain cases it is highly desirable that the measurement of weight or volume be effected continuously.

From U.S. Pat. No. 5,143,254, mechanical devices are already known which make it possible to assure an extremely accurate dosaging of powdered products with a dosed unit quantity which may be very small. The present invention proposes an alternative to these devices which makes possible an extremely compact embodiment.

Another object of the invention is to propose a volumetric dosaging device in which the unit doses quantity can be very easily regulated without varying the speed of drive of the dosaging device.

SUMMARY OF THE INVENTION

These purposes are achieved by a dosaging slide and a delivery piston, which are arranged in the manner explained below. In accordance with the invention, the dosaging device comprises:

- a dosaging slide having a propulsion surface;
- a groove in which the dosaging slide moves between a bottom dead center and a top dead center;
- means which make it possible to feed material to be dosed to said groove;
- a transfer chamber in communication with the groove at the top dead center;
- a delivery piston sliding in the transfer chamber parallel to the propulsion surface of the dosaging slide, the delivery piston having a side wall the shape of which enables it closely to fit the propulsion surface of the dosaging slide;
- a screen intended to cover said groove;

the unit volume dose being defined in said groove when the dosaging slide is at its bottom dead center, when the delivery piston closes said groove and when the screen covers said groove.

In order to avoid any interruption in the feed of the dosaging device, the latter preferably has a filling member which permits the filling the dosed unit volume up to rejection by forcing the material to penetrate into it.

DESCRIPTION OF THE DRAWINGS

The following figures illustrate one application of the invention to the dosaging of powdered products used in the rubber manufacturing industries, in particular for the dosaging of sulfur, carbon black, or other currently used reinforcing fillers, generally existing in the form of powder.

DESCRIPTION OF PREFERRED EMBODIMENTS

Figure 1:
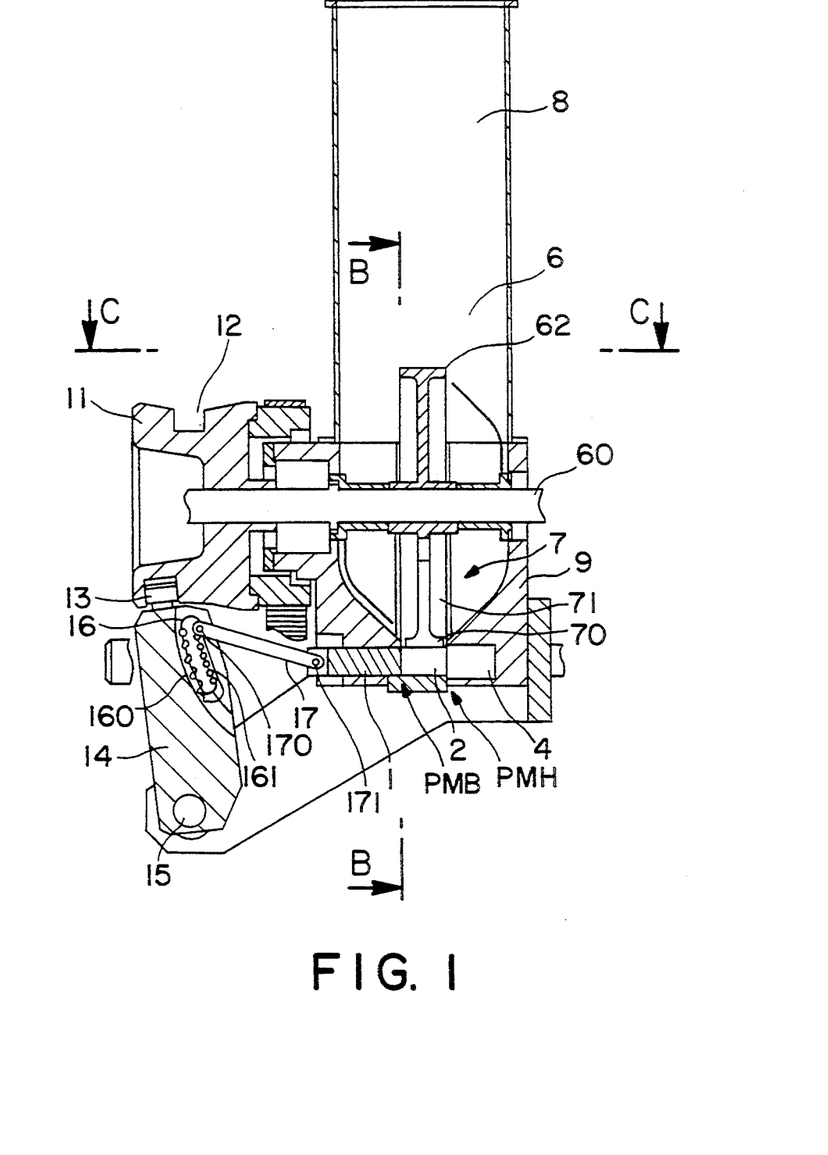
FIG. 1 shows the dosaging device of the invention in a sectional view along the line A—A of FIG. 2.
Figure 2:
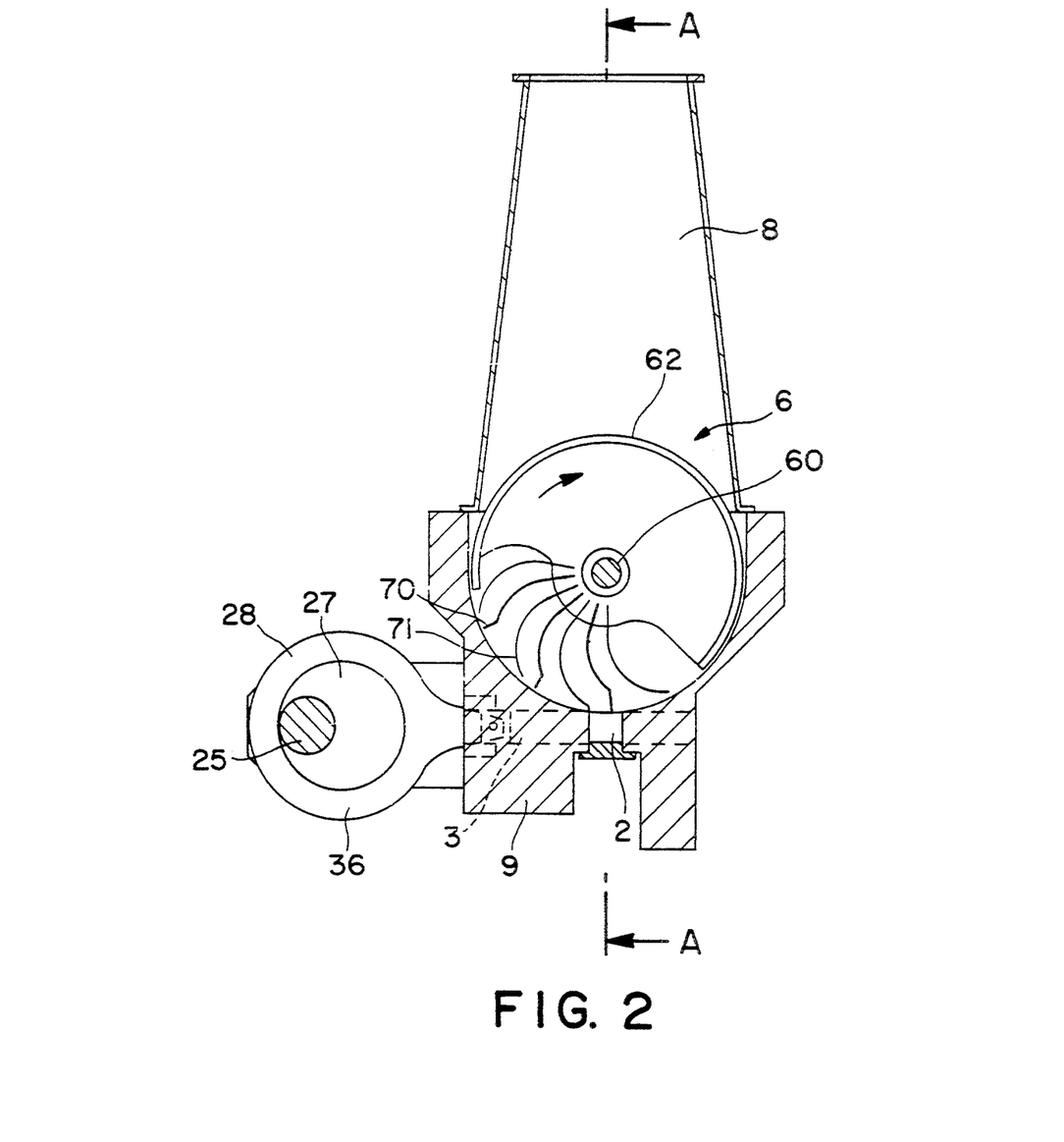
FIG. 2 is a section along the line B—B of FIG. 1.

FIGS. 1 and 2 show a housing 9 in which a linear groove 2 is machined. Said groove communicates with a transfer chamber 4 formed by a piercing within the housing 9. The groove 2 is defined by side walls 20 and a groove bottom. It constitutes a guidance path for a dosaging slide 1. The groove 2 is open on top and communicates with a hopper 8 mounted on top of the housing 9. The hopper 8 contains in loose form the material to be dosed. The hopper 8 is also arranged in such a manner as to be able to feed the said groove 2 with material by gravity. The dosaging slide 1 slides in the groove 2 between a top dead center PMH and a bottom dead center PMB.

Figure 4:
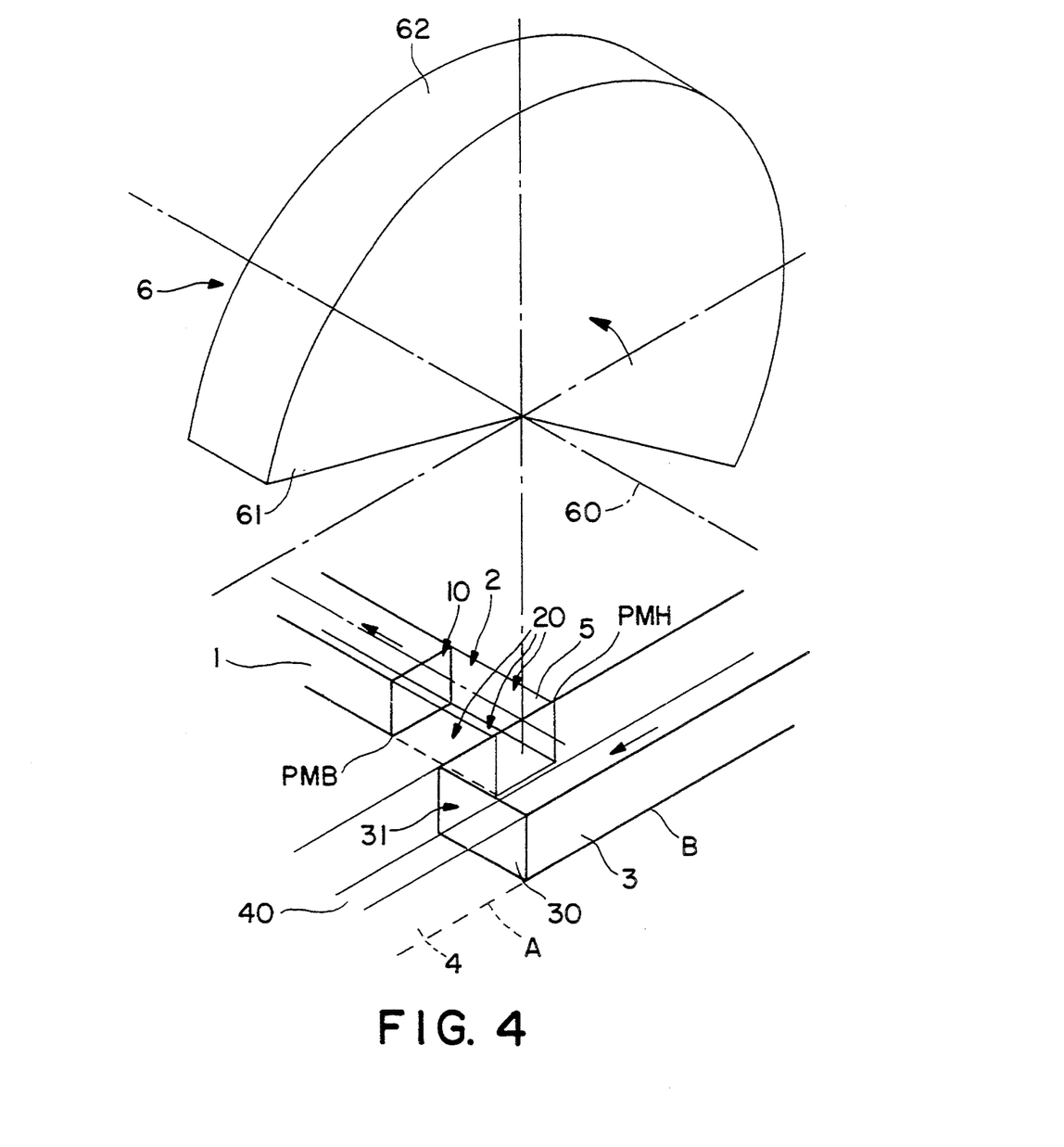
FIGS. 4 to 10 are diagrams of the dosaging device in different stages of its operation.

The transfer chamber 4 contains a delivery piston 3 which slides within it. The delivery piston 3 is movable between the point A of its stroke and the point B of its stroke (FIG. 4). The expulsion orifice 40 of the transfer chamber communicates with a receptacle which receives the dosed material or leads directly into a mixing chamber into which the material dosed is continuously incorporated.

Within the hopper 8 there is a wheel 6 the axis of rotation 60 of which is parallel to the sliding movement of the dosaging slide 1 and which can be clearly seen in FIG. 2. This wheel has a peripheral screen 62. The screen 62 is formed of a cylindrical portion which extends approximately over an angle of 220° the purpose of which will become evident from the following. In the complementary angle, there can be noted an assembly of rigid shoes 70 and flexible blades 71 which constitute a filling member 7 which forces the material to enter into the unit volume, in this case by favoring flow by gravity. The flexible blades 71 are shown without deformation in FIG. 2, in which the arrow indicates the direction of rotation of the wheel 6. The wheel 6 therefore combines the roles of screen 62 and of mixing member and member filling the unit volume.

Figure 3:
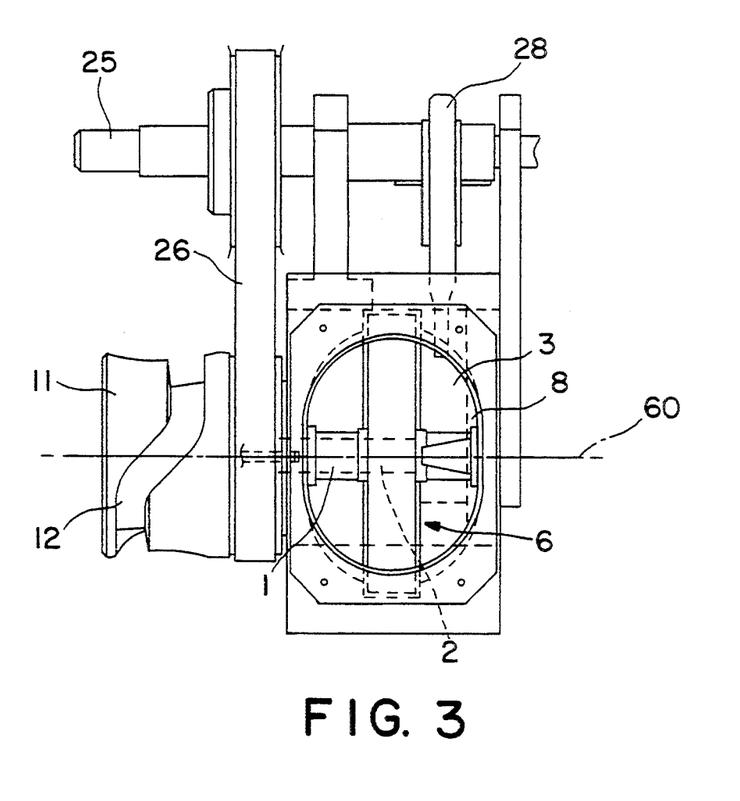
FIG. 3 is a section along the line C—C of FIG. 1.

An input shaft 25 drives the rotatable shaft 60 in rotation by means of notched belt 26 (FIG. 3). A cam 11 is mounted on the rotation shaft 60 and is also driven by said input shaft. This cam 11 has a guide path 12 machined into its periphery. A rocker 14 (FIG. 1) is pivoted around a trunnion 15 which is integral with the housing 9. A roller 13 is mounted on the end of the rocker 14. The roller 13 is engaged in the guide path 12 traced on the cam 11. A connecting rod 17 actuated by the rocker 14 controls the movements of the dosaging slide 1. The displacement of the point of articulation 170 of the connecting rod 17 along the rocker 14 makes it possible to regulate (manually, with the dosaging device stopped) the stroke of the dosaging slide 1, moving the articulation point 170 closer to or further from the trunnion 15.

Adjustment of the articulation point 170 of the connecting rod 17 is effected in a manner which makes it possible at all times to retain the same top dead center. In fact, if one assumes that the dosaging slide 1 is at its top dead center PMH then, upon displacing the point of articulation 170 of the connecting rod 17 over a circular arc traced on the rocker 14 and centered on the opposite end 171 of the connecting rod 17, the position of the top dead center is not affected. On the other hand, it is seen that one moves towards or away from the trunnion 15 which is the pivot point of the rocker 14, an adjustment of the stroke is thus effected by displacing the position of the bottom dead center.

In order to be able to effect a fine adjustment of the position of the bottom dead center, a kidney-shaped coupling part 16 is preferably provided which can slide somewhat in a slightly larger housing provided on the rocker 14. This coupling part 16 bears various piercings 161 arranged on a circular arc, as explained above. The articulation point 170 of the connecting rod 17 is coupled on one of them.

Furthermore, the coupling part 16 is immobilized on the rocker by inserting a locking pin in a piercing developed astride the edge of the coupling part 16 and the rocker 14. These piercings are, for instance, arranged in a circular arc as has been explained above. These piercings assume the shape of two half piercings 160, namely the half piercings made on the rocker 14 and those made on the coupling part 16. The latter are spaced from each other by a distance which is slightly less than for the preceding ones. A single pair of half piercings 160 can be brought into coincidence so as to receive the said blocking shaft, but this pair can be selected by sliding the coupling part 16 in its housing on the rocker 14. The amplitude of the sliding corresponds substantially to the distance between two of the piercings 161. Within this clearance, one can select from between as many positions as there are pairs of half piercings 160, which permits fine adjustment of the position of the point of articulation 170 of the connecting rod 17 with respect to the trunnion 15.

An eccentric 27 (FIG. 2) is mounted on the input shaft 25. It drives a connecting rod 28 which controls the delivery piston 3.

FIGS. 4 to 10 are simplified diagrammatic showings, drawn in perspective in order to show the movements of the main dosaging devices.

The unit volume to be dosed is thus established when the dosaging slide 1 is pulled back to the level of its bottom dead center. This is the configuration indicated diagrammatically in FIG. 4. The unit volume to be dosed is thus represented by a cavity 5 located in the bottom of the hopper 8. This cavity 5 is defined by the walls 20 of the groove 2, by the propulsion surface 10 of the dosaging slide 1, and by the side wall 31 of the delivery piston 3.

Figure 5:
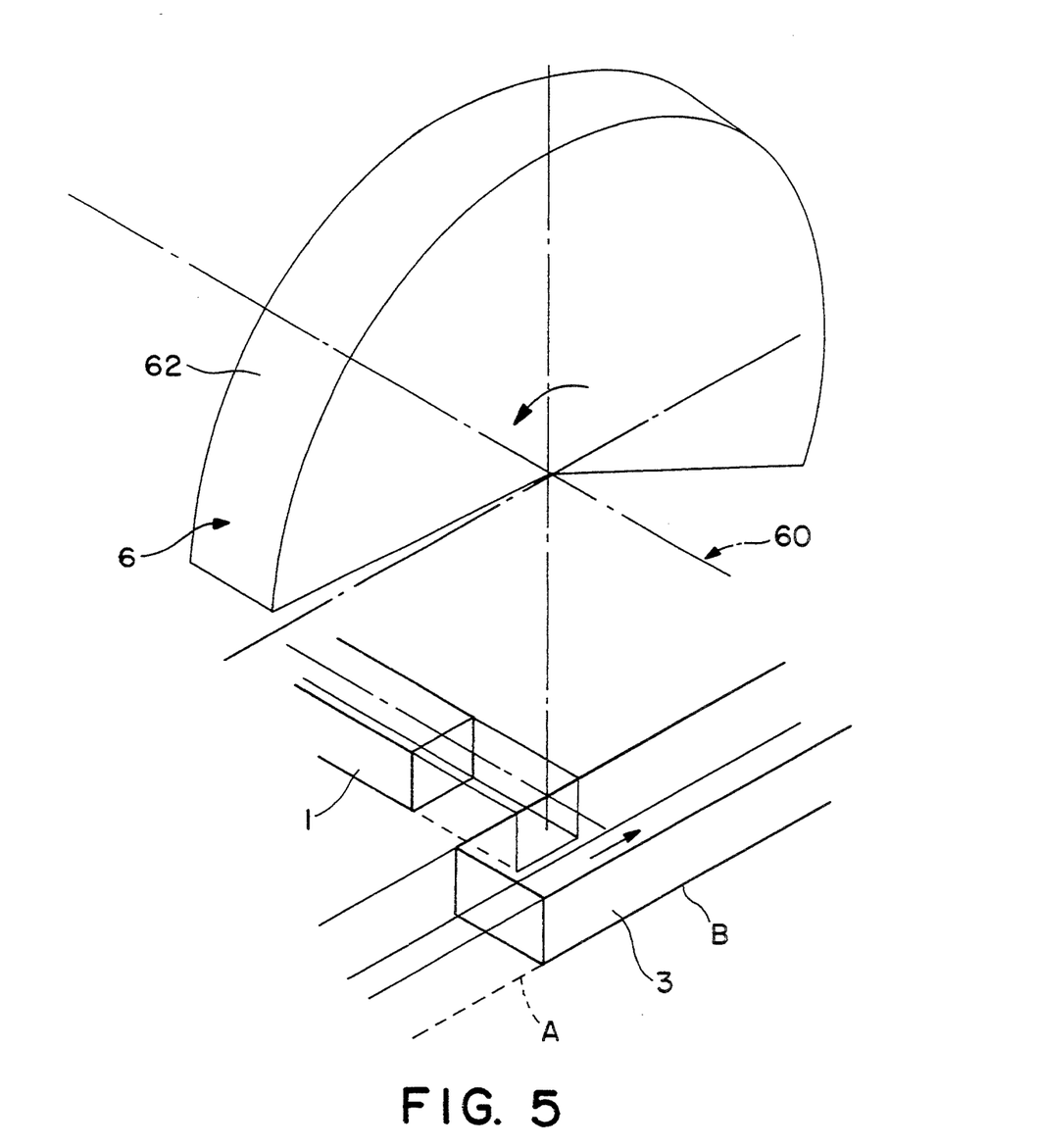
Figure 6:
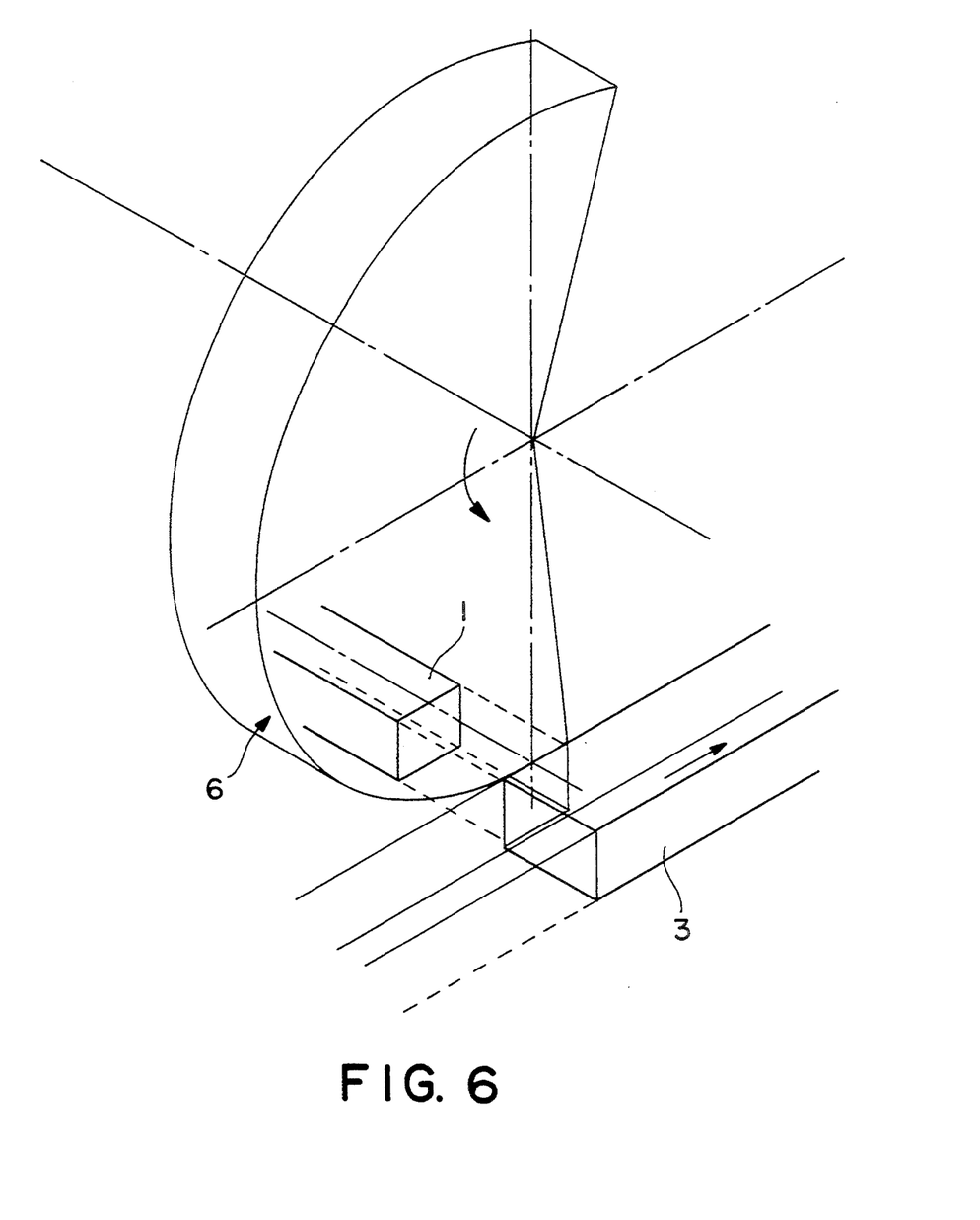

The operation of the dosaging device is as follows: FIG. 4 diagrammatically shows the stage of admission of the material into the unit volume. The rotation of the wheel 6 permits the flexible blades 71 and the shoes 70 to move over the groove 2 in which the cavity 5 is defined. The shape of the flexible blades 71 permits positive displacement of the material in order to force it to enter into the cavity 2. The cavity becomes gradually filled with material and the flexible blades 71 assume a more strongly curved attitude. In FIG. 5, it is seen that the delivery piston 3 has started its movement of return towards its bottom dead center. The dosaging slide 1 is still stationary. FIG. 6 shows the end of the admission stage. In order completely to define the unit volume, the screen 62 covers the opening present above the groove 2.

The unit dosaging volume is thus completely isolated from the hopper 8 and also from the expulsion orifice 40, since the delivery piston 3, while continuing its movement of return towards the bottom dead center, has not yet uncovered the communication between the groove 2 and the transfer chamber 4.

Figure 7:
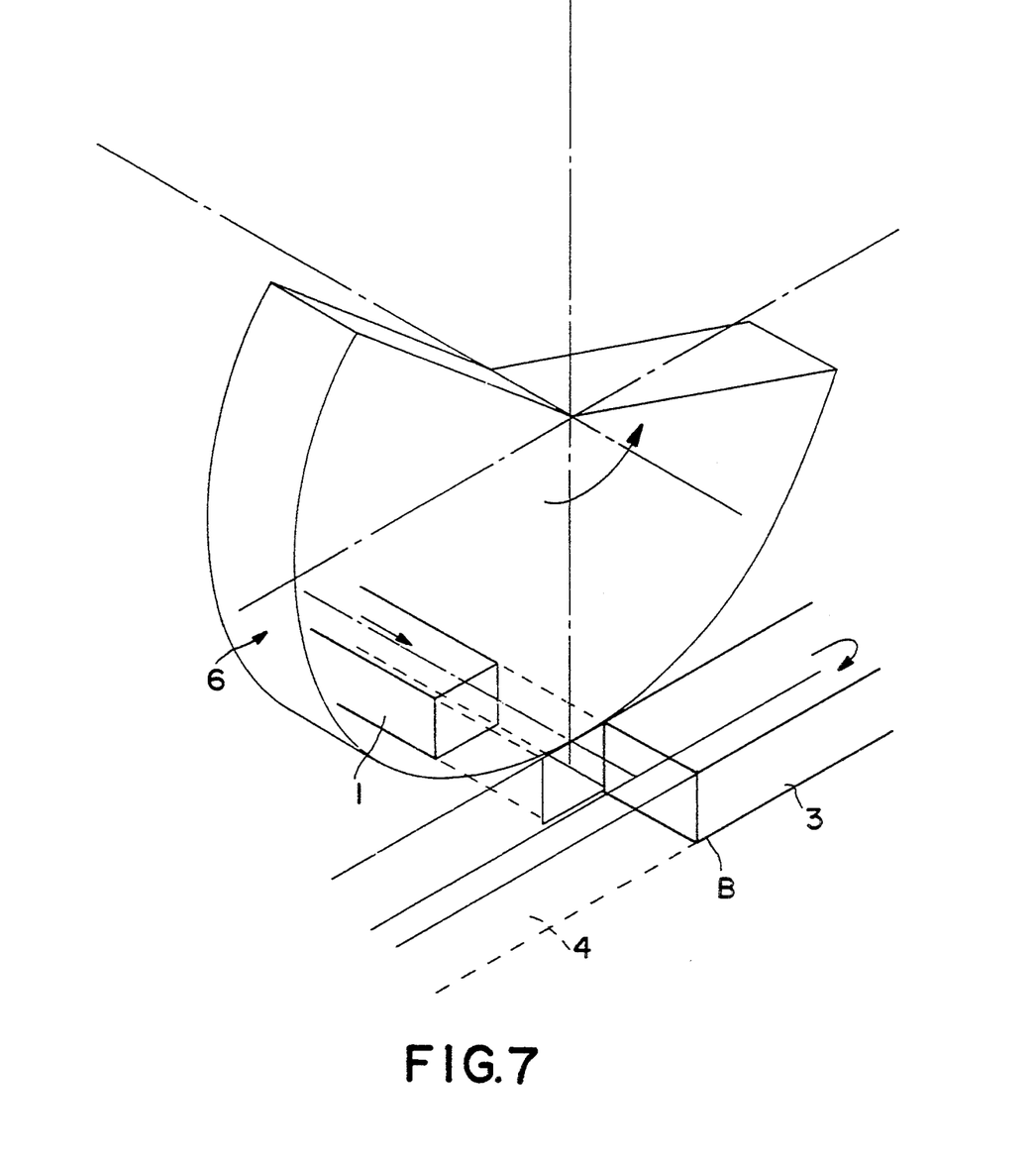

In FIG. 7, the delivery piston 3 has reached its bottom dead center at B. The wheel 6 continues to turn. In view of the size of the screen 62, the orifice for the introduction of the material into the groove 2 continues to be separated and isolated from the hopper 8. The dosaging slide 1 starts its movement from bottom dead center to top dead center in order to expel the material from the unit dosaging volume. The essential factor is that the tightness of the unit volume appearing in FIG. 6 is assured. Depending on the compressibility of the material dosed, the dosaging slide 1 can start its movement towards its top dead center slightly before the communication between groove 2 and transfer chamber 4 has been established.

Figure 8:
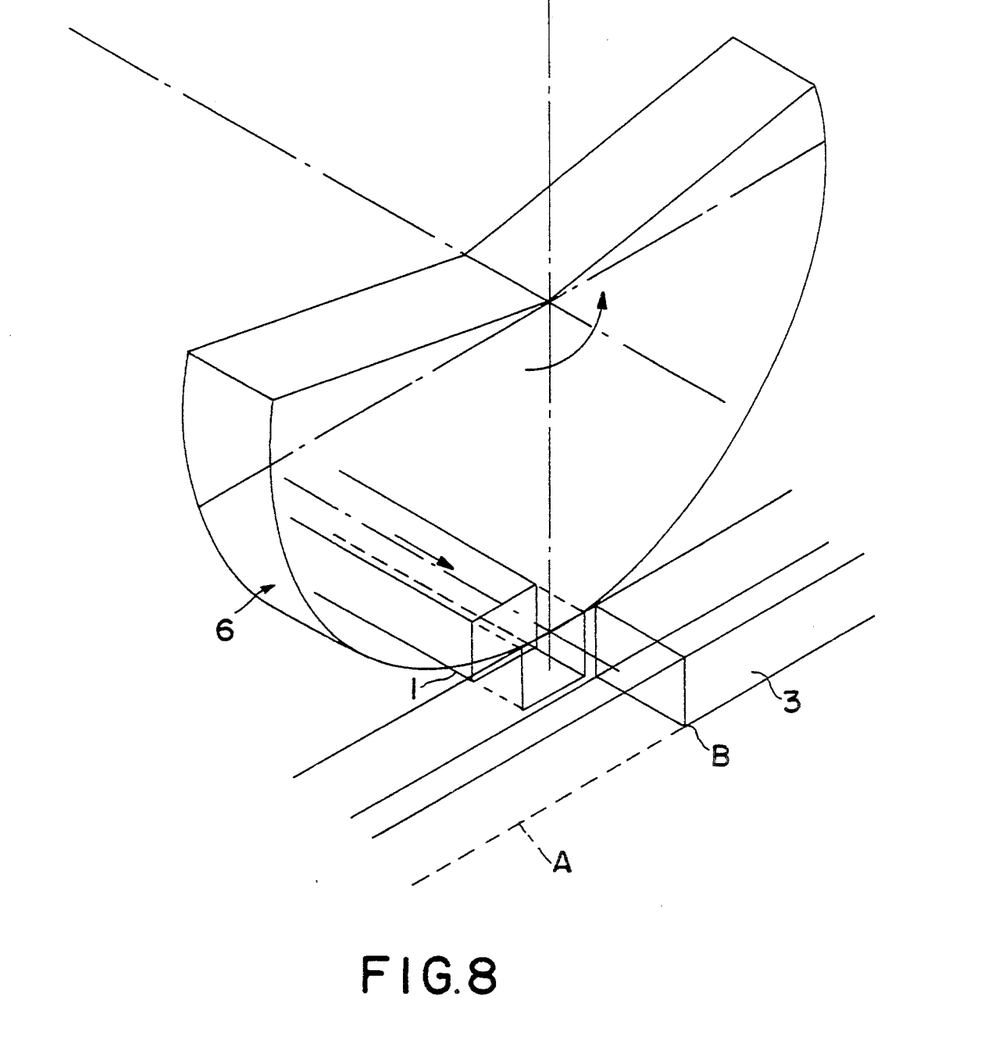

In FIG. 8 it is seen that the dosaged material passes progressively into the transfer chamber 4.

Figure 9:
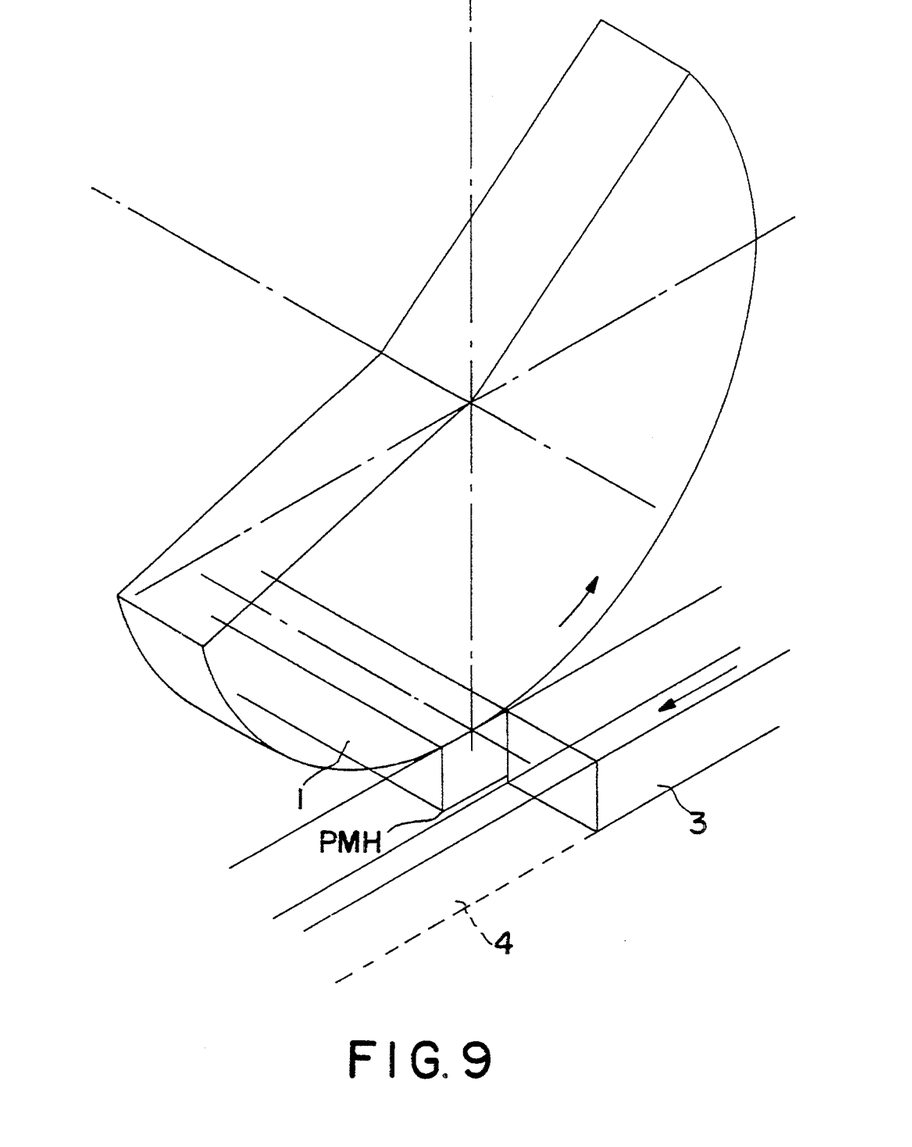

In FIG. 9 the dosaging slide has reached its top dead center. The material dosed has thus passed completely into the transfer chamber 4.

Figure 10:
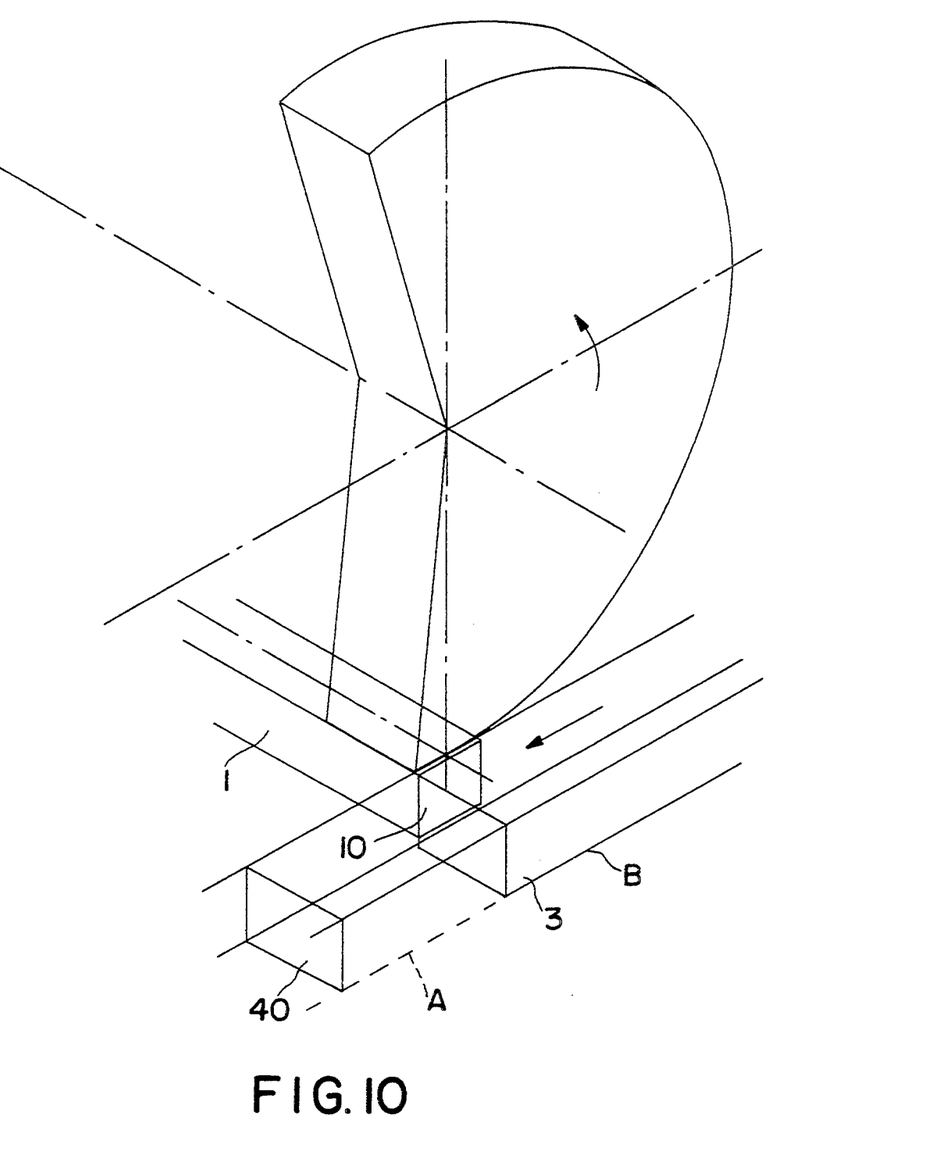

In FIG. 10 it is seen that the delivery piston 3 moves from the point B to return to the point A. It thus assures the expelling of the dosed material in positive manner through the expulsion orifice 40. Due to the use of a delivery piston 3, the dosaged material can be pushed back, even against a very high back pressure. It is seen that, as a result of this movement, the delivery piston 3 scrapes the propulsion surface 10 of the dosaging slide 1 and thus assures that no material remains within the groove 2.

The screen 62 is dimensioned so as to close the groove 2 at least up to the time that the side wall 31 of the delivery piston 3 completely covers the propulsion surface 10 of the dosaging slide. In this way, there is never a direct communication between the inside of the hopper 8, in which the material to be dosed is stored in bulk, and the transfer chamber 4. The perfect volumetric correction of the dosaging device is thus guaranteed.

The screen 62 of the device described is formed by a portion of a cylinder. Of course, the side wall of the dosaging slide 1 has a precisely complementary shape. The cross section of the groove 2 is identical to the cross section of the propulsion surface of the dosaging slide. This surface resembles a rectangle, except that one of the side is replaced by a circular arc. It goes without saying that the person skilled in the art could imagine structural variants without going beyond the scope of the present invention. In particular, the groove could be of lesser height than the propulsion surface of the dosaging slide. It is sufficient to assure guidance of the dosaging slide and, at the end of the admission stage, to again close the unit volume in order to form the unit displacement of the dosaging device.

The dosaging device then returns to the admission stage: The screen 62 uncovers the top of the groove 2 and the dosaging slide 1 moves back towards its bottom dead center. The order of these movements is unimportant.

The invention thus proposes a method of volumetrically dosaging a powdered or granulated product which consists in using:
- a dosaging slide sliding within a groove between a top dead center and a bottom dead center,
- a delivery piston sliding within a transfer chamber in communication with the said groove at the top dead center, and
- a screen, and in establishing an operating cycle as follows:

partially defining a unit volume by the dosaging slide having moved back to the bottom dead center position selected, allowing the delivery piston to shut off communication between the groove and the transfer chamber, maintaining the groove open for the time necessary in order that the product introduced into the groove completely fills the unit volume, isolating said unit volume by covering said groove by the screen, causing the delivery piston to move back so that it uncovers the groove, advancing the dosaging slide to its top dead center in order to transfer the product from the unit volume, thereupon, while maintaining the dosaging slide stationary, causing the propulsion surface of the dosaging slide to be scraped by the delivery piston by advancing the latter until it masks the communication between the groove and the transfer chamber in order to expel the said unit volume, and repeating the operating cycle in order to expel as many unit volumes of product as desired.

As already explained, this method makes it possible, by adjusting the position of the bottom dead center, to vary the unit volume. In general, it is advantageous to use means of agitation within the hopper in order to favor the flow of product into the unit volume.

Referring now more particularly to FIG. 3, it will be understood that the path 12 of the cam 11 is traced in a manner appropriate to obtain the movements of reciprocation and the pauses which have just been described. Although it is possible to regulate the flow dosaged by the device by controlling the speed of drive of the device, one may in numerous applications prefer varying the flow by controlling the unit displacement volume of the dosaging device as explained above by varying the bottom dead center position of the dosaging slide. Even in case of adjustment of the stroke, the immobility of the position of the top dead center provides assurance that the unit volume dosed is emptied upon each cycle of the device.

This makes it possible to insert the device in a more complicated machine, comprising, for instance, several dosaging devices, such as a continuous mixer for the preparation of rubber. Thus, the invention also extends to a method of preparing a raw rubber mix, characterized by the fact that the dosaged product is expelled directly into a mixer.

I claim:

1. A method of volumetrically dosaging a powdered or granulated product, utilizing
   a dosaging slide sliding in a groove between a top dead center and a bottom dead center,
   a delivery piston sliding within a transfer chamber in communication with said groove at the top dead center, and
   a screen capable of covering said groove,
   and in establishing an operating cycle as follows:
   partially defining a unit volume by the dosaging slide having moved back to the bottom dead center selected, allowing the delivery piston to close the communication between the groove and the transfer chamber,
   maintaining the groove open for the time necessary for the product introduced into the groove to completely fill the unit volume,
   isolating the said unit volume by covering said groove by said screen,
   causing the delivery piston to move back so that it uncovers the groove,
   advancing the dosaging slide up to its top dead center in order to transfer the product out of the unit volume,
   thereupon, while maintaining the dosaging slide stationary, causing the propulsion surface of the dosaging slide to be scraped by the delivery piston by advancing the latter until it closes the communication between the groove and the transfer chamber in order to expel the said unit volume,
   and repeating the operating cycle in order to expel as many unit volumes of product as desired.

2. A method according to claim 1, characterized by the fact that the position of the bottom dead center is adjusted in order to vary the unit volume.

3. A method according to claim 1, used to prepare a raw rubber mix, characterized by the fact that the product dosed is expelled directly into a mixer.

4. A dosaging device for feeding a unit volume of material comprising:
   a dosaging slide having a propulsion surface,
   a groove in which the dosaging slide slides between a bottom dead center and a top dead center,
   means for feeding the said groove with material to be dosed,
   a transfer chamber in communication with the groove at the top dead center,
   a delivery piston sliding in the transfer chamber parallel to the propulsion surface of the dosaging slide, the delivery piston having a slide wall the shape of which enables it closely to fit the propulsion surface of the dosaging slide,
   said feeding means including a screen covering said groove, the unit volume being defined in said groove when the dosaging slide is at its bottom dead center, when the delivery piston closes the said groove, and when the screen covers the said groove.

5. A device according to claim 4, characterized by the fact that the cross section of the groove corresponds to the cross section of the dosaging slide.

6. A device according to claim 4, in which the feeding means includes a hopper containing the material to be dosed, the hopper being arranged so as to feed the said groove by gravity.

7. A device according to claim 4, including means for adjusting the position of the bottom dead center along the groove.

8. A device according to claim 7, in which the dosaging slide is driven by a connecting rod actuated by a rocker, and in which said adjusting means includes means for mounting a point of articulation of the connecting rod on the rocker in different positions distributed over a circular arc, the arc being traced on the rocker when the dosaging slide is at its top dead center and is centered on the opposite end of the connecting rod.

9. A device according to claim 4, in which the feeding means includes a feeding member which forces the material to penetrate into the unit volume.

10. A device according to claim 9, in which the feeding means includes a wheel arranged in said hopper and having flexible blades and shoes constituting the feeding member.

11. A device according to claim 10, characterized by the fact that the wheel has a cylindrical portion constituting the said screen.

* * * * *